A. B. GRIFFEN.
LIQUID MEASURING PUMP.
APPLICATION FILED OCT. 29, 1909.
969,271.
Patented Sept. 6, 1910.
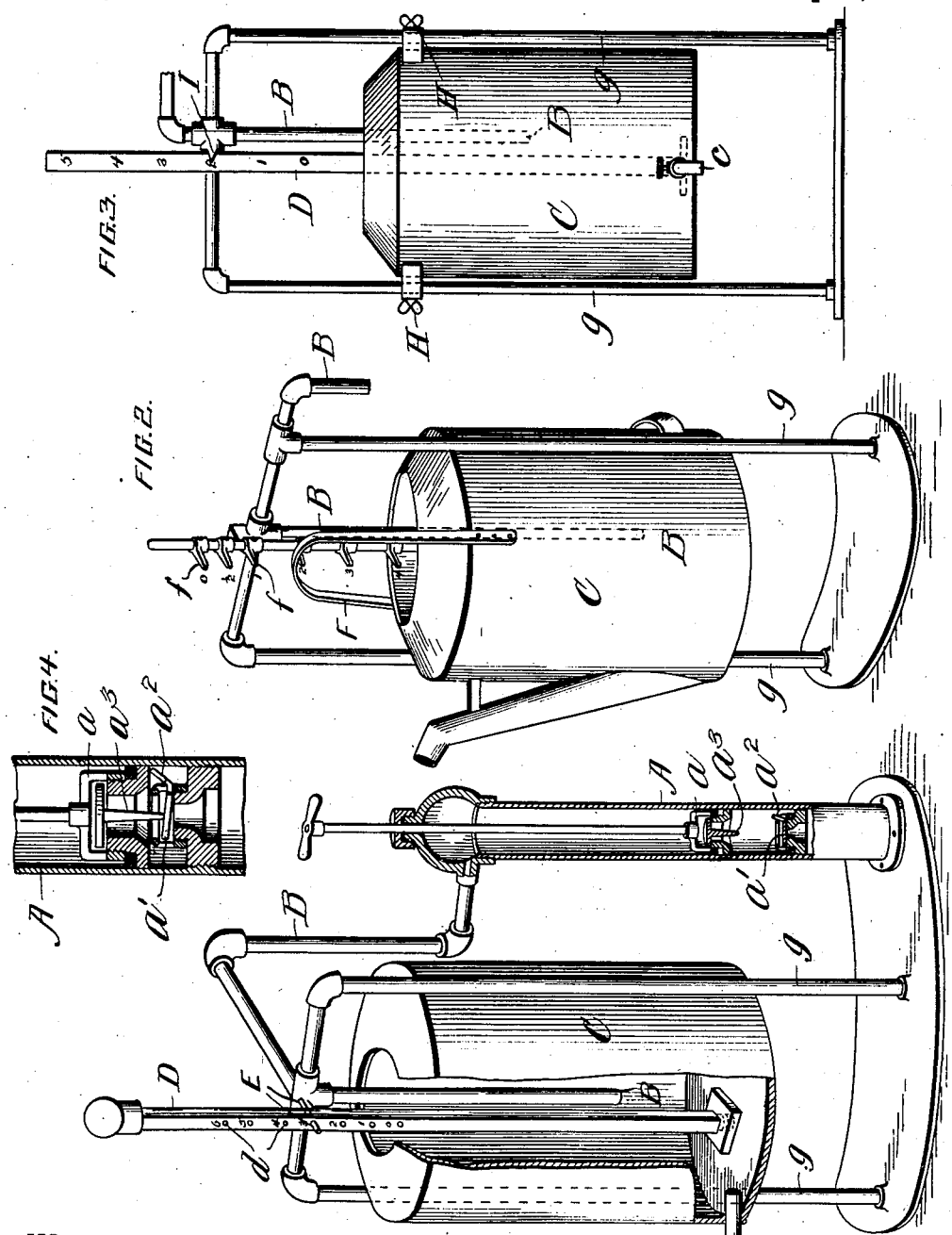
WITNESSES:
INVENTOR
BY Arthur B. Griffen
Attorneys

UNITED STATES PATENT OFFICE.

ARTHUR B. GRIFFEN, OF VERONA, NEW JERSEY.

LIQUID-MEASURING PUMP.

969,271.  Specification of Letters Patent.  Patented Sept. 6, 1910.

Application filed October 29, 1909. Serial No. 525,300.

*To all whom it may concern:*

Be it known that I, ARTHUR B. GRIFFEN, a citizen of the United States, residing at Verona, in the county of Essex and State of New Jersey, have invented certain new and useful Improvements in Liquid-Measuring Pumps, of which the following is a specification.

My invention relates to that class of devices in which a predetermined amount of liquid is automatically delivered without regard to the total capacity of the receiving vessel, and the object of my improvements is to provide a simple, accurate and economical means for accomplishing this purpose.

To this end I provide, in connection with a pump provided with trip valves, whereby when the valves of the pump are tripped the contents of the pump cylinder and its connections are siphoned back to the source of supply, or other siphoning means, a vertically adjustable receiving vessel within which the discharge pipe from the pump terminates. This vessel is provided with means for varying the distance between the lower end of the discharge pipe and the bottom of the vessel, and also with means for indicating the quantity of liquid that will be contained in the vessel, below the end of the discharge pipe.

In using the device liquid is pumped into the receiving vessel until the lower end of the discharge pipe is covered. The pump valves are then tripped and so much of the liquid in the vessel as is above the end of the discharge pipe is siphoned back to the source of supply, leaving the vessel filled up to the level of the end of the discharge pipe. The amount remaining, which has been previously determined by adjustment of the elevation of the vessel in relation to the end of the discharge pipe, is accurately indicated by the indicating means. The liquid is then drawn off from the receiving vessel into such receptacle as may be desired. In this manner a simple and efficient means of discharging and indicating a predetermined quantity of liquid is provided.

The invention will be best understood by reference to the accompanying drawings, which illustrate embodiments thereof.

Figure 1 shows a section of a pump constructed in accordance with my invention. Fig. 2 is a similar view, showing a removable receiving vessel; and Fig. 3 shows a modification of the means for holding the receiving vessel at different levels and indicating the quantity of liquid. Fig. 4 is a detail sectional view of a portion of the pump barrel and plunger showing the plunger in its lowest position, and the valves opened.

Referring to the drawings, A, indicates a pump provided with trip valves, $a$, $a'$, so arranged, in any suitable or well known manner, that when the pump piston is dropped to its extreme lower limit, the valves are opened and the liquid in the pump cylinder and its connections runs, or is siphoned back to the source of supply. In this instance I have shown the pump barrel provided at its lower end with a valve $a'$ having a trip projection $a^2$ adapted to be struck by the plunger when the latter reaches its lowest position and slightly lift the valve from its seat. The piston is provided with a valve $a$ having a stem $a^3$ projecting below the same in such position as to strike the lower valve or the casing thereof and open the valve $a$ when the piston is in lowest position. Fig. 4 shows the positions of the valves $a$, $a'$ when the piston is in its lowest position.

B indicates the discharge pipe of the pump which terminates within the vertically adjustable receiving vessel, C. As shown in Fig. 1, the receiving vessel, C, is provided with a discharge pipe and cock, $c$, and is arranged to move vertically between guide rods, $g$, $g$. The vessel, C, is provided with means for raising and holding it at predetermined levels, which, as shown in Fig. 1, consists of a metal lifting rod or strap, D, attached to the bottom of the vessel, and provided with holes, $d$, $d$, adapted to engage with a pin, or catch, E. The holes $d$, $d$, are so located that, whichever may be in engagement with the pin, E, the vessel, C, will be held at such a level in relation to the outlet of discharge pipe, B, that the space between the end of the pipe and the bottom of the vessel will hold a determined quantity of liquid, which may be, and preferably is, indicated by figures upon the strap, D. Thus if when the pin, E, is in the lowermost of the holes, $d$, $d$, the end of pipe, B, is in contact with the bottom of vessel, C, such lowermost hole would be marked, $o$. The next hole above would be marked with the quantity which would be contained between the bottom of the vessel, C, and the end of discharge pipe, B, when the pin, E, is in that hole, and so on throughout the series, the amount of liquid to be delivered in each case being determined by the elevation of the vessel, C.

In the modification shown in Fig. 2, the vessel, C, is arranged to be removable, and is provided with a bail, F, arranged to be hung upon one or another of a series of supports, f, f. In this case the bail, F, and supports, f, f, perform the same function as the lifting rod, D, with the holes, d, d and pin, E, shown in Fig. 1.

If desired, the indicating scale may be independent of the means for holding the vessel, C, at the desired height, as shown in Fig. 3. In this case the vessel, C, is shown as provided with a set screw, H, adapted to impinge upon one of the guide rods, g, g, to hold the vessel at the desired height, and the lifting strap, D, is provided with a scale moving opposite a pointer, I, to indicate the quantity. Evidently other means of holding the receiving vessel of the desired height and other arrangements of indicating devices, as well as other means of siphoning liquid from the vessel, C, which will readily occur to those skilled in the art, may be adopted, without departing from the nature of my invention.

In any case, it being desired to dispense a given quantity of liquid, the vessel, C, is so adjusted that it will contain, below the point to which the pipe, B, extends, the quantity to be dispensed, which is shown by the indicating means. The pump, A, is then operated until the vessel, C, is filled up to, or somewhat above, the lower end of the pipe, B. The pump piston is then pushed down so as to open the trip valves, a, a, and so much of the liquid in the vessel, C, as is above the outlet of the pipe, B, if any, is siphoned out of the vessel, leaving therein only so much as is below the outlet of pipe, B, being the amount called for. The liquid is then poured or drawn from the vessel, C, into any desired receptacle. In this manner exactly measured quantities of oils, gasolene, or other liquids may be quickly and conveniently dispensed.

What I claim as new and desire to secure by Letters Patent is:

1. In a device for dispensing measured quantities of liquids the combination of a pump provided with trip valves, a receiving vessel, a discharge pipe from the pump having its outlet within said vessel, and means for varying the elevation of said vessel in relation to the outlet of said pipe.

2. In a device for dispensing measured quantities of liquid, the combination of a receiving vessel, a pump, a discharge pipe from said pump having its outlet within said vessel, means for effecting the opening of the pump valves by adjustment of the pump piston to siphon the liquid contained in said vessel above the outlet of the discharge pipe back to the source of supply through said pump and discharge pipe and means for varying the elevation of said vessel in relation to the outlet of said discharge pipe.

3. In a device for dispensing measured quantities of liquid, the combination of a vertically adjustable vessel, a pump provided with a discharge pipe having its outlet within said vessel, means provided with indications for indicating the containing capacity of said vessel below the outlet of said pipe and means for effecting the opening of the pump valves to siphon the liquid in said vessel above the outlet of the pipe, back to the source of supply.

4. In a device for dispensing measured quantities of liquid the combination of a receiving vessel, a pump provided with a discharge pipe having its outlet within said vessel and means constituting a quantity indicating device, for suspending said vessel with the bottom thereof at variable measured distances from the outlet of said pipe.

5. In a device for dispensing measured quantities of liquid the combination of a pump, a receiving vessel, a discharge pipe from said pump having its outlet within said vessel, means for lifting said vessel and means engageable with the lifting means for holding said vessel at different predetermined elevations and for indicating the effective capacity thereof when so held.

6. In a device for dispensing measured quantities of liquid the combination with a pump and discharge pipe therefrom of a series of suspending devices disposed at different levels whereby a receiving vessel may be held with the bottom thereof at different measured distances from the outlet of the discharge pipe.

In testimony whereof, I have hereunto subscribed my name, this 22d day of October, A. D., 1909.

ARTHUR B GRIFFEN.

Witnesses:
AUGUSTUS E. RACE,
LA MATT A. FRINK.